Patented Apr. 21, 1953

2,636,028

UNITED STATES PATENT OFFICE 2,636,028

ORGANIC ACID-POLYAMINE ADDUCTS

Harry J. Sommer, Lafayette, Tom B. Albin, Oakland, and Paul H. Williams, Berkeley, Calif., assignors to Shell Development Company, San Francisco, Calif., a corporation of Delaware No Drawing. Application March 24, 1950,
Serial No. 151,824

20 Claims. (Cl. 260—97.5)

This invention relates to novel compositions of matter, and to a process for their preparation. More particularly, the present invention relates to compositions of matter essentially comprising the reaction product of certain polymeric oxygen-containing organic polyamines with organic acids or with derivatives of organic acids convertible by hydrolysis to the free acid.

An object of the present invention is to provide a new and useful composition of matter. Another object of the invention is new compositions of matter produced by treating a haloepoxyalkane with a concentrated solution of ammonia in a polar solvent, such as water, to produce polymeric oxygen-containing amines and condensing the polymeric oxygen-containing amines with an organic acid or a derivative of an organic acid that is hydrolyzable to the organic acid. The provision of new compositions of matter useful as improved modifying agents for asphaltic compositions and for oleaginous lubricant compositions, and in themselves as lubricants for special purposes and as compositions for coating and sizing of fibrous materials, is another object of the invention. Compositions of the character indicated herein, distinguished by high melting or softening points and by freedom from color, form a special object of the invention. Other objects of the invention will become apparent from the nature of the disclosures and claims hereinafter.

In accordance with the present invention, the new and useful compositions of matter are prepared by treating a haloepoxyalkane, such as epichlorohydrin, with an excess of a concentrated solution of ammonia in a polar solvent, such as water, and condensing the polymeric oxygen-containing amines thereby produced with an organic acid or with a derivative of an organic acid that is hydrolyzable to the acid, such as an organic acid anhydride or acid halide, or an ester of an organic acid. In accordance with a preferred aspect of the invention, the mixture obtained by the treatment of the haloepoxyalkane with the concentrated solution of ammonia advantageously is heated in the presence of an added strong fixed alkali to remove the solvent and excess ammonia by evaporation and the alkali-treated polymeric oxygen-containing amine is then condensed with the organic acid or derivative thereof as hereinbefore and hereinafter described.

The haloepoxyalkanes that are employed in accordance with the invention contain the epoxide group substituted on or joining in a ring structure two carbon atoms of a halo-substituted alkane. The preferred haloepoxyalkanes contain not more than ten carbon atoms. The haloepoxyalkane desirably contains not more than the one epoxide group and the one atom of halogen as the only substituents. The halogen may be iodine, bromine or chlorine, the chloroepoxyalkanes being preferred. Of the various haloepoxyalkanes, the one most suited to the objects of the invention is epichlorohydrin, i. e., 1,2-epoxy-3-chloropropane. Other haloepoxyalkanes that can be employed in accordance with the broader aspects of the invention include, for example, 2,3-epoxy-4-chlorobutane; 1,2-epoxy-2-isopropyl-3-iodopropane; 1,2-epoxy-4-chlorobutane; 1,2-epoxy-5-chloropentane; 1,2-epoxy-2-methyl-3-chloropropane; 1,2-epoxy-3-methyl-3-chlorobutane; 1,2-epoxy-2-methyl-3-bromopropane; 2,3-epoxy-4-methyl-1-chlorohexane; and 1,2-epoxy-4-methyl-5-bromopentane.

The initial step in the process comprises treating the haloepoxyalkane, e. g., 1,2-epoxy-3-chloropropane, with an excess of a concentrated solution of ammonia in a polar solvent, such as water, a water-miscible monohydric or polyhydric alcohol, dioxane, etc., the preferred solvent being water. The concentration of the ammonia in the polar solvent, and hence, in the reaction mixture, is an important condition of the process of the invention, since if concentrations lower than the minimum suitable concentration are employed final products of a distinctly different character are obtained. The initial concentration of the ammonia in the reaction mixture should be not less than about 15% by weight, based upon the amount of the polar solvent present, and preferably not less than about 20% by weight of the polar solvent. The ammonia preferably is supplied to the process in the form of a concentrated aqueous solution, such as the 26° Bé. aqueous solution of commerce, or at an even higher concentration. Although the ammonia and the solvent ordinarily are most conveniently employed as a previously prepared solution of the ammonia in the solvent, they may be added separately, as by separately charging the desired amounts of the solvent and gaseous or liquid NH₃ to the reaction vessel, or by charging only a part of the ammonia previously dissolved in the solvent. Additional amounts of ammonia, either as NH₃ or as a solution in a polar solvent, may be added during the treatment of the haloepoxyalkane with ammonia.

The ammonia is employed in a molar excess based upon the amount of the haloepoxyalkane. There is employed more than one mole of ammonia per mole of the haloepoxyalkane, and there most desirably is employed a total of not less than three moles of ammonia per mole of the haloepoxyalkane. The most desirable products of the invention have been prepared from the polymeric oxygen-containing amines produced by treatment of one mole of the haloepoxyalkane with from about 4 to about 20 moles of ammonia. There preferably is employed not over about 25 moles of ammonia per mole of the haloepoxyalkane.

The temperature during the treatment of the haloepoxyalkane with the aqueous ammonia may range from the ambient room or atmospheric temperature (about 20° C.), or even below, up to about 100° C. A preferred temperature range is from about 25° C. to about 55° C. A particularly convenient temperature is about 40° C. In order to prevent loss of $NH_3$ by volatilization during the reaction, particularly when the more elevated temperatures are employed, the reaction may be carried out in a closed vessel under the autogenous pressure of the reaction mixture or under an atmosphere of an inert gas, such as nitrogen, methane, hydrogen, etc., introduced into the reaction vessel under pressure. Subject to this precaution, the treatment of the haloepoxyalkane with aqueous ammonia most conveniently is carried out under substantially atmospheric pressure.

In accordance with a preferred aspect of the invention, the haloepoxyalkane is added to the solution of ammonia in the polar solvent at a controlled rate, either in a continuous manner or in increments, thereby reducing the tendency toward formation of polymer of the haloepoxyalkane. The rate of addition of the haloepoxyalkane desirably is so controlled that the reaction mixture during the addition of the haloepoxyalkane is homogeneous except for any small transient amounts of the added haloepoxyalkane that may have accumulated. The time for the addition of the haloepoxyalkane to the solution of ammonia and the completion of the reaction is in general from about ½ hour to about 4 hours, depending upon the temperature and the other reaction conditions. Addition of the haloepoxyalkane over a period of from about 15 minutes to about 45 minutes, followed by an additional ½ to 2 hours at about 40° C. usually results in complete reaction. The extent of the reaction can be followed conveniently by withdrawing test aliquots of the reaction mixture and estimating by analysis the content of organic amine groups or of unreacted $NH_3$, the former approaching an upper limiting value determined by the particular haloepoxyalkane and the reaction conditions, and the latter similarly approaching a minimum value.

Following the reaction between the haloepoxyalkane and the aqueous solution of ammonia, the water and the excess or uncombined ammonia are removed from the reaction mixture. This may be carried out most conveniently by evaporation or distillation under reduced pressure. Other methods may be used to remove the water and uncombined ammonia. For example, the water can be removed by contacting the crude mixture with a desiccating agent, such as anhydrous calcium sulfate, or the ammonia may be removed by adsorption on an acidic resin. In general, the excess ammonia and the water preferably are removed by evaporation at temperatures within the range of from about 100° C. to about 170° C., with the aid of reduced pressures if desired.

Concurrently with or subsequent to the removal of water and of unreacted ammonia, the product obtained by the condensation of the haloepoxyalkane and the ammonia preferably is heated in the presence of added fixed alkali. Suitable fixed alkalies are the mineral alkalies, such as the alkaline earth metal hydroxides and oxides and the alkali metals and their hydroxides, oxides and carbonates, the alkali metal alcoholates, quaternary ammonium bases, and the like. Specific suitable fixed alkalies include sodium hydroxide, potassium hydroxide, potassium carbonate, sodium carbonate, lithium hydroxide, potassium bicarbonate, rubidium hydroxide, rubidium oxide, sodium methylate, calcium oxide, barium hydroxide, trimethylbenzylammonium hydroxide, metallic sodium, and metallic potassium. Alkalies stronger in aqueous solution than ammonia, as well as materials convertible by reaction with water to such stronger alkalies are employed, the preferred fixed alkalies being alkalies that form neutral or non-hydrolyzing halide salts. The alkali metal hydroxides and the carbonates and the alkaline earth metal hydroxides and oxides are particularly preferred.

The amount of the fixed alkali that is used is determined by or based upon the amount of halogen that is present in the mixture to be treated. Preferably the fixed alkali is added in an amount stoichiometrically equivalent to the amount of ionic halogen that is present. Smaller amounts of the fixed alkali may upon occasion be employed, a preferred minimum being about 0.75 stoichiometric equivalents of the alkali based upon the halogen content of the mixture. Less desirably, an amount of the fixed alkali greater than that equivalent to the ionic halogen that is present may be employed, excesses of up to about 100% being employed. In such cases, the alkali in excess of that equivalent to the halogen content, or at least a part thereof, may be present in the resulting mixture. Upon the subsequent condensation with the organic acid or derivative the excess fixed alkali will be converted to a mineral salt of the organic acid. Since the preferred products of the invention are essentially mineral salt-free, the amount of added alkali desirably is limited to an amount not greater than is equivalent to the total amount of halogen.

The heating of the condensation product of the haloepoxyalkane and ammonia with fixed alkali serves in part to dispel or to displace any ammonia that is present as ammonium halide. The condensation product preferably is heated in the presence of the added fixed alkali to a temperature of from about 100° C. to about 170° C. until substantially all materials that volatilize at the selected temperature have been removed, i. e., until evolution of the polar solvent and ammonia substantially ceases. By using reduced pressures the removal of the polar solvent and the ammonia may be completed at lower temperatures. It appears, however, that modification of the condensation product itself results from the action of the fixed alkali at the temperatures within the range indicated above. The preferred products have been obtained by the process which includes the step of heating the condensation product of the haloepoxyalkane and the ammonia in the presence of the added fixed alkali to the temperatures above about 125°.

The metal halide formed by reaction of the added fixed alkali with the ammonium halide present in the crude reaction mixture may precipitate as a solid. The salt may be removed from the molten mixture at this time as by filtration, centrifugation, or equivalent means, or it may be allowed to remain in the mixture pending subsequent removal.

The alkali-treated condensation product of the haloepoxyalkane and ammonia, when cooled to room temperatures, ranges from a soft, waxy solid to a hard semi-resinous material. It contains only negligible amounts, if any, of organic halogen, that is, of halogen chemically bound to an organic radical. It contains crystalline material, although it is not uniformly crystalline. When the process up to this point has been carried out under the preferred conditions, the product is substantially white, frequently having the general appearance and feel of a hard wax. It has little or no odor. It dissolves only slowly in water, and it is soluble to a limited extent in oil, indicating oleophilic as well as limited hydrophilic characteristics. Products with melting or softening points within the range of from about 40° C. up to 140° C. or even higher have been prepared.

Examination of the condensation product of the haloepoxyalkane and ammonia has indicated the product to be a complex mixture containing only minor amounts, if any, of diamino alkanols, such as would be formed by the reaction of two molecules only of ammonia with each molecule of the haloepoxyalkane. The condensation product of 1,2-epoxy-3-chloropropane and ammonia prepared according to the method described above thus generally contains only from about 5% to about 25% of 1,3-diamino-2-hydroxy propane. The condensation product is believed to comprise predominantly, polymeric polyamino alkanols ranging in degree of polymerization from dimers to trimers of diamino-monohydroxyalkanes. Relatively more of the dimeric products are formed when a high ratio of ammonia to the haloepoxyalkane is used, while relatively more of the trimeric products are present when there is used a lower ratio of ammonia to the haloepoxyalkane.

The polymeric polyamino alkanols that are present appear to be mixtures of hydroxy-substituted secondary and tertiary amines containing a plurality of amino- and hydroxy-substituted alkyl radicals which, in the case of the polymers prepared from 1,2-epoxy-3-chloropropane and ammonia very likely conform to the formula

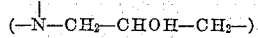

A linear dimer thus would be

H—(NH—CH₂—CHOH—CH₂)₂—NH₂ while a linear trimer would be

H(NH—CH₂—CHOH—CH₂)₃—NH₂ or

NH₂—CH₂—CHOH—CH₂—NH—CH₂—
  CHOH—CH₂—NH—CH₂—CHOH—CH₂—NH₂

The linear dimers will be seen to contain both primary and secondary amino nitrogen atoms, but no tertiary amino nitrogen. Since both N-(2-hydroxy-3-aminopropyl)-2-hydroxy propylene diamine-1,3 and N,N'-di(2-hydroxy-3-aminopropyl)-2-hydroxy propylene diamine-1,3 (a linear dimer and a linear trimer, respectively, of 1,3-diamino-2-propanol) are reported to be liquids at normal room temperatures, whereas the condensation products that are utilized for the preparation of the novel products of the present invention are solids at normal room temperatures, it is considered to be likely that the condensation products contain or consist essentially of branched-chain, cyclic, or cross-linked polymers of diamino-monohydroxy alkanes. One possible closed-chain or cyclic trimer of 1,3-diamino-2-propanol would have the formula (—NH—CH₂—CHOH—CH₂—)₃ while another could be represented by the formula

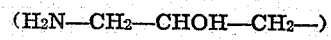

A cross-linked trimer would be represented by (NH₂—CH₂—CHOH—CH₂—)₃ N while the formula (NH₂—CH₂—CHOH—CH₂—)₂N—CH₂—
  CHOH—CH₂—N(—CH₂—CHOH—CH₂NH₂)₂ represents a cross-linked pentamer. The first cyclic trimer will be seen to contain only secondary amino nitrogen atoms. The second cyclic trimer contains one each of a primary, a secondary, and a tertiary amino nitrogen atom, while the represented cross-linked trimer and pentamer contain only primary and tertiary amino nitrogen atoms. The polymeric product also contains a smaller proportion of corresponding molecules having units of the isomeric configuration

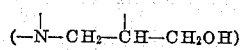

wherein the hydroxyl group is linked to a primary rather than to a secondary carbon atom and one of the amino nitrogen atoms is attached to a secondary carbon atom rather than to a primary carbon atom. Additionally, it is considered that there is present in the polymeric condensation product a significant portion of oxyether linkages resulting from condensation through alcoholic hydroxyl groups, with or without condensation through amino groups, thus forming polyamino oxy compounds in which a portion or all of the oxy oxygen is present in ether linkages.

While it is considered that the foregoing general description of the intermediate product is correct, the exact configurations of the polymeric constituent molecules of the intermediate product has not been definitely determined. Intermediate products suitable for the preparation of the novel amides of the invention have mean molecular weights of up to about 4000 or even higher. The preferred intermediate products have mean molecular weights of from about 100 up to about 1500.

In accordance with the invention, the intermediate condensation product, prepared as above, is combined with an organic acid or a suitable derivative of an organic acid to convert at least a portion of the amino groups of the intermediate product into amido groups,

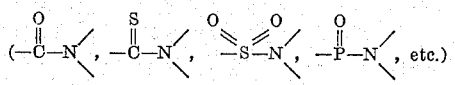

In some cases, the acylation reaction can be carried out between the polymeric oxygen-containing amine and the selected acid per se, while in other cases suitable derivatives of the acids, such as an acid anhydride, an acid halide, or an ester of the acid, may be employed.

The products of the invention are advantageously represented by those N-acyl-substituted polymeric oxygen - containing amines wherein the N-acyl groups are the acyl groups of carboxylic acids. Representative carboxylic acids are the fatty acids and other fat acids, especially the long-chain aliphatic acids containing eight or more carbon atoms, polycarboxylic acids, naphthenic acids, especially those of petroleum origin, wax acids (produced by incomplete oxidation of petroleum or like wax), resin acids of either plant or animal origin, rosin acids and chemically modified rosin acids, and artificial or natural mixtures containing such carboxylic acids, e. g., tall oil, refined tall oil, red oil, and crude acids obtained by saponification of natural glyceride oils, such as peanut, rape, palm, whale, tung, cocoanut, linseed, corn, cottonseed, fish, or other oil, tallow, or the like. The preferred products contain the acyl groups of the carboxylic acids having molecular weights upwards from about 130, and preferably within the range of from about 150 to about 500. Especially preferred products are obtained when the acyl groups are the acyl groups of aliphatic monocarboxylic acids containing from 12 to 20 carbon atoms. Representative of such aliphatic monocarboxylic acids are oleic, stearic, lauric, palmitic, myristic, arachidic, ricinoleic, petroselinic, vaccenic, linolenic, linoleic, eleostearic, licanic, parinaric, tariric, godoleic, arachidonic, palmitoleic, hydnocarpic, chaulmoogric, gorlic, and like fatty acids. The N-acyl groups may be the same or they may be different.

Novel products provided according to the invention may contain in addition to or in lieu of the acyl groups of the foregoing and like carboxylic acids, the acyl groups of organic acids which contain an acidic group other than carboxyl, such as a thiocarboxyl group, a sulfo group, or a phosphinico or phosphono group, as well as the arsenic- and the selenium-containing analogs of the phosphinico and phosphono groups. Illustrative products are those wherein the N-acyl group is the acyl group of one or more of the following organic acids, among others: thiocarboxylic acids, such as the carbothioic acids, thionocetic acid, thioloacetic acid, thiopropionic acid, thiopalmitic acid, thiomyristic acid, and dithioazeleic acid, as well as the carbodithioic acids, such as dithioisovaleric acid, dithiocarbamic acid, dithiobutyric acid, and dithioisocapronic acid; sulfonic acids such as sulfoacetic acid, 3-hydroxy-1-propanesulfonic acid, 1-hexadecanesulfonic acid, 2-aminoethanesulfonic acid, methionic acid, 1-octanesulfonic acid, the sulfonation products of $C_8$ to $C_{16}$ olefins, e. g., of the olefins produced by cracking of petroleum waxes, benzenesulfonic acid, toluenesulfonic acids, sulfooleyl amine, alkylaryl sulfonic acids obtainable by sulfonation of the hydrocarbons formed by alkylation of toluene and the xylenes with the dimers, trimers and tetramers of $C_3$ to $C_5$ olefins, sulfonated dehydrated castor oil, and sulfonated long-chain alcohols (e. g., sulfonated oleyl alcohol); phosphonic acids, such as benzenephosphonic acid, isobutanephosphonic acid, alpha-phosphonobutyric acid, isopentanephosphonic acid, 4-oxo-2-methylpentane-3-phosphonic acid, toluenephosphonic acid, hexadecanephosphonic acid, and acidic, or partial esters of such phosphonic acids, e. g., with monohydric alcohols; phosphinic acids, such as dimethylphosphinic acid, diethyldithiophosphinic acid, isoamylphosphinic acid, acetonylphosphinic acid, and bis(p-aminophenyl) phosphinic acid.

In the preparation of the novel products of the invention the proportion of the organic acid or derivative thereof relative to the amount of the intermediate condensation product described above may be varied within reasonable limits. By judicious selection of suitable proportions products having various desirable and useful characteristics can be prepared. In general, the ratio of the amount of the organic acid or derivative to the amount of the intermediate condensation product of the haloepoxyalkane with ammonia is expressed in terms of the number of stoichiometric equivalents of the former per stoichiometric equivalent of the latter, the stoichiometric equivalency of the intermediate condensation product being conveniently determined by titration with a standardized solution of acid according to known methods. A suitable general range includes ratios from as high as 100:1 to as low as 1:100, a preferred range being from about 25:1 to about 1:25. Although either the carboxylic acid component or the intermediate condensation product of the haloepoxyalkane with ammonia can be employed in excess, especially desirable products are those that are prepared when the organic acid or derivative is employed in an amount less than that equivalent to the amount of the intermediate condensation product. Thus, in the preferred products less than all of the amino nitrogen atoms are substituted by acyl groups.

The partial amides that are formed by treating one equivalent of the alkali-treated polymeric oxygen-containing amine with from about 0.20 to about 0.80, and more preferably from about 0.20 to about 0.40 equivalents of a high molecular weight fatty acid, such as an aliphatic monocarboxylic acid containing from 14 to 20 carbon atoms, have distinctive properties. The partial amides in which from about 20% to about 40% of the nitrogen atoms are present in amido groups have properties that make them of outstanding value as additives useful for improving characteristics of asphaltic compositions, such as paving asphalts, roofing asphalts, paper-sizing asphalts, and the like. When the products that are prepared according to the invention are to be employed in the compounding of greases and like compositions comprising oleophilic materials intimately associated with finely divided solid inorganic materials having a very large ratio of surface to volume, the carboxylic acid advantageously may be employed in amounts up to one equivalent per equivalent of amino nitrogen present in the condensation product.

The novel products of the invention are prepared by mixing the organic acid or a suitable derivative thereof with the alkali-treated intermediate condensation product of the haloepoxyalkane and ammonia and heating the mixture under substantially anhydrous conditions. The total amount of each reactant may be added at the outset. In other cases, one or both of the reactants may be added portionwise, continuously or intermittently, to the reacting mixture. An initial mixture of the reactants may be prepared and acylation reaction effected therein, the mixture subsequently divided into a plurality of portions, one or more of which is or are treated with an additional amount of a selected reactant and the portions then combined or blended.

The reaction between the carboxylic acid and the alkali-treated intermediate condensation product may be conducted in the presence of or with the aid of gaseous agents which may react, such as carbon dioxide, hydrogen chloride, ammonia, ethylene oxide, methyl amine, etc., or which may serve simply to assist in removing volatile material, e. g., water, from the reaction mixture. Nitrogen, gaseous hydrocarbons and like inert gases may be employed. The reaction may be conducted in the presence of organic solvents or diluents, such as aromatic hydrocarbons, e. g., toluene, xylene, benzene, cumene, etc., aliphatic hydrocarbons, such as iso-octane, halogen-substituted hydrocarbons, such as chloroform or other inert organic solvent. Water formed by the reaction can be removed continuously by vaporizing an azeotropic mixture of water and a suitable added organic solvent that forms azeotropic mixtures with water, e. g., xylene, ethanol, etc.

The reaction temperature can be varied according to the particular organic acid or derivative thereof that is to be reacted with the polymeric oxygen-containing amine. A general temperature range is from about 50° C. to about 275° C. The most valuable products have been obtained by treating the polymeric oxygen-containing amine with higher carboxylic acids at temperatures above about 150° C., preferably within the range of from about 150° C., to about 250° C.

After the reaction between the organic acid or derivative and the polymeric oxygen-containing amine is completed, the resulting product can be filtered, cooled, and stored, or it can be utilized directly in its intended application. The thermal stability of the novel amides prepared according to the invention is such that they can be retained in the molten state by heating over prolonged periods of time without deterioration. This frequently is a pronounced advantage from the standpoint of ease of transportation and utilization thereof.

The novel amides of the invention range at ordinary room temperatures from hard wax-like materials to soft, unctuous, salve-like products. The preferred products of the invention are characterized by their substantial lack of color, by their high stability at elevated temperatures, and by their high melting points and their hardness at ordinary temperatures. The preferred products prepared by treating as hereinabove described the intermediate condensation product of the haloepoxyalkane and ammonia with less than the stoichiometric equivalent of a long-chain aliphatic monocarboxylic acid have the appearance of white to light cream-colored waxy solids superficially resembling in appearance and texture a refined candle wax.

Products having melting points as high as 113° C. have been prepared by condensing 1,2-epoxy-3-chloropropane with ammonia in a 1:5 molar ratio and forming the partial amide by reaction of the alkali-treated condensation product with mixtures of fatty acids comprising predominantly oleic and palmitic acid in the ratio of one-third equivalent of the mixture of fatty acids per equivalent of the alkali-treated intermediate condensation product. The novel partial amides thus obtained can be dispersed or emulsified in boiling water with agitation; they are only poorly or slightly soluble in water at room temperature. While they may be dissolved in various dilute aqueous acids, such as hydrochloric, sulfuric, hydrobromic, or like strong mineral acids, they are substantially insoluble in 0.1 M aqueous solutions of phosphoric acid.

The preferred partial amides of the invention are soluble in highly aromatic organic solvents, such as aromatic hydrocarbons, e. g., benzene, aromatic petroleum fractions, such as petroleum fractions distilling in the kerosene range and having a predominating content of aromatic materials, and the like.

Products having a penetration at room temperatures within the range of from 0 to 20 (100 grams, 5 seconds, 25° C.) have been prepared. The high stability at elevated temperatures, the high melting points and the hardness at ordinary temperatures contribute significantly to the utility and advantages of the products of the invention.

Salts of the partial amides produced as hereinbefore and hereinafter described, can be prepared by reacting the partial amides with acids at the ambient temperature or at moderately elevated temperatures, such as up to about 100° C. For some purposes the amount of the acidic material combined with the partial amide to produce a salt desirably is less than the amount equivalent to the neutralizable amino groups present in each molecule of the partial amide. In other cases an excess of the salt-forming acidic material may be used. The acid may be the same as that from which the N-acyl group or groups are derived, or it may be a different acid. Preferred salt-amides are those in which both the amide-forming and the salt-forming acid residues are residues of long-chain aliphatic acids containing from 14 to 20 carbon atoms.

The preferred products are those wherein not over about 80% of the nitrogen atoms other than the amido nitrogen atoms in the partial amide are combined in salt linkages with the salt-forming residue (—OOCR) of a carboxylic acid, such as a long-chain aliphatic carboxylic acid. Such salt-amides of the invention wherein from about 20% to about 40% of the nitrogen atoms are combined in N-substituted amido groups

and from about 40% to about 70% are present in salt, or N-acyloxy-ammonium groups

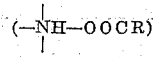

have particularly desirable properties. In general, the amount of the salt-forming acidic material employed may range from as little as 10% up to as much as 300% or more of the amount that is equivalent to the neutralizable amino groups present in the partial amide. In the partial amides, the neutralizable amino groups are considered to be those amino groups titratable with aqueous perchloric acid to the end point of methyl orange indicator.

The salts of the partial amides can be prepared simply by mixing the partial amide with the desired amount of the salt-forming acidic material, the reaction being accelerated, if desired, by heating up to temperatures of about 100° C. The neutralization may be carried out in the presence or absence of solvents.

The following examples are illustrative of the invention.

EXAMPLE I

An aqueous solution of ammonia containing about 28% by weight $NH_3$ was placed in a glass-lined reaction vessel equipped with internally-located coils through which cooling and heating fluids could be conveyed, reflux condenser, a power-driven stirrer and suitable valved ports for addition of charge and withdrawal of product. For each mole of $NH_3$ charged there was slowly added with agitation 0.1 mole of 1,2-epoxy-3-chloropropane. During the addition of the 1,2-epoxy-3-chloropropane and the subsequent reaction period, the temperature of the stirred mixture was maintained at 40° C. while vapors evolved from the mixture were continuously condensed and returned to the reaction vessel. After 1.7 hours, inclusive of the time for addition of the 1,2-epoxy-3-chloropropane, the reflux condenser was removed and steam was passed through the heating coils until the temperature of the mixture reached 100° C., water and excess ammonia distilling off. There then was added to the remaining mixture 0.96 mole of sodium hydroxide per mole of the 1,2-epoxy-3-chloropropane charged. The resulting mixture was heated to a temperature of about 175° C. while additional amounts of ammonia and water distilled off. To the remaining mixture there then was added tallow fat acids in an amount corresponding to one-third of the amount equivalent to the amount of nitrogen contained in the mixture, and the mixture was heated at 175° C. for one hour. After sodium chloride, formed during the addition of the caustic alkali, settled out, the supernatent liquid was withdrawn by decantation and cooled. The melting point of the product thus prepared was found to be 103° C. (Ring-and-Ball Method).

EXAMPLE II

A salt of the product prepared in Example I was formed by mixing with a portion of the cooled product an amount of tallow fat acid equal to 69.6% of that required to neutralize the neutralizable amino groups of the partial amide and heating the resulting mixture to about 100° C. and then cooling.

EXAMPLE III

Example II was repeated except that there was employed an amount of tallow fat acid equal to 30% of that required to combine with the neutralizable amino groups of the partial amide.

EXAMPLE IV

Example III was repeated except that the fatty acids of refined tall oil were substituted in an equivalent amount for the tallow fat acids. The fatty acids contained about 50% oleic acid, about 40% linoleic acid, about 4% linolenic and about 6% of rosin acids.

EXAMPLE V

A second partial amide was prepared according to the procedure described in Example I except that the ratio between the amounts of ammonia and 1,2-epoxy-3-chloropropane was 1:5 (molar basis) instead of the 1:10 used in Example I. The partial amide thus prepared was found to have a melting point of about 93° C.

EXAMPLE VI

A portion of the partial amide produced in Example V was heated at about 75° C. with tallow fat acids in an amount equivalent to 75.8% of the content of neutralizable amino groups in the partial amide.

EXAMPLE VII

Example VI was repeated except that the tallow fat acids were added in an amount equal to 33.7% of that equivalent to the neutralizable amino nitrogen present in the partial amide.

EXAMPLE VIII

Example VII was repeated substituting for the tallow fat acids an equivalent amount of the fatty acids from refined tall oil employed in Example IV.

EXAMPLE IX

In an autoclave one mole of 1,2-epoxy-3-chloropropane was slowly added with stirring to 5 moles of ammonia in the form of a 28% by weight aqueous solution while the mixture was heated at 70° C. After a total reaction time of 1.35 hours at 70° C., the pressure was reduced to atmospheric and the mixture was heated to 100° C. to distill off water and unreacted ammonia. An amount of sodium hydroxide equivalent to the chlorine content of the mixture (as determined by titration with $AgNO_3$) then was added and the resulting mixture further heated to about 175° C. for one hour, additional amounts of water and ammonia being volatilized. To the resulting mixture there were added tallow fat acids in an amount equal to one-third of the amount equivalent to the amount of aminonitrogen contained in the mixture and the resulting mixture was heated at 175° C. for one hour. Sodium chloride which had separated then was removed by filtration and the filtrate was cooled to room temperature.

EXAMPLE X

A salt-amide was prepared by mixing with a portion of the product of Example IX tall oil acids in an amount 74.3% of that equivalent to the neutralizable amino nitrogen of the amide, and then heating the mixture at about 75° C. for about one hour and cooling.

EXAMPLE XI

Example X was repeated, the amount of the tall oil acids being reduced from 74.3% to 32.0% of the amount equivalent to the neutralizable amino nitrogen of the amide.

EXAMPLE XII

To one mole proportion of ammonia furnished as a 28% solution in water, there was slowly added with agitation 0.1 mole proportion of 1,2-epoxy-3-chloropropane at 40° C. After 1.5 hours the mixture was heated to 100° C. to drive off water and unreacted ammonia. An amount of caustic alkali equivalent to the ionic chlorine present was added, and the mixture was heated to a temperature of about 175° C. While the mixture was maintained at 175° C., refined tall oil (containing between 55% and 60% of fatty acids, between 34% and 38% of rosin acids, and from 6% to 10% of sterols, higher alcohols, etc.) was added in an amount equal to one-third of that theoretically required to combine with the amino nitrogen present in the mixture. After one hour at 175° C., the mixture was filtered to remove sodium chloride that had precipitated and the filtrate was cooled to room temperatures. The product was a waxy solid melting at about 103° C.

EXAMPLE XIII

A portion of the partial amide prepared in Example XII was treated at about 60° C. with a further quantity of the same refined tall oil in an amount equal to 29.3% of that required to neutralize the remaining amino groups.

EXAMPLE XIV

Example XIII was repeated except that the amount of refined tall oil was increased to 58.6% of that required to neutralize the remaining neutralizable amino groups.

EXAMPLE XV

Example XIII was repeated substituting for the refined tall oil an equivalent amount of tallow fat acids.

EXAMPLE XVI

Example XIV was repeated substituting for the refined tall oil an equivalent amount of tallow fat acids.

EXAMPLE XVII

The effectiveness of the products prepared in Examples I to XVI as agents for improving the retention characteristics of asphalt was determined by means of the "Modified Total Water Immersion Test," using a soda rhyolite (Oakland, California) aggregate. The "Modified Total Water Immersion Test" is carried out as follows:

Two hundred grams of aggregate passing ½ inch mesh screen but retained by ¼ inch mesh screen are wet with 2% by weight of water and mixed for 1 minute. The asphalt composition to be tested is heated to 212° F. and mixed with the aggregate (which has a temperature of about 77° F.), 6% of the asphalt based upon the weight of the aggregate being used. The coated rock then is spread out in a 6 inch crystallizing dish. After standing for 60 minutes at 77° F., the contents of the dish are covered with distilled water and the dish is held at 77° F. for 20 hours. The aggregate while under water then is visually inspected and the surface which has remained covered is estimated. The result is expressed as the per cent of the surface that remains covered. It is reported as the per cent of coating retained.

The results obtained in this manner, upon addition of samples of the products prepared in Examples I through XVI (in the form of a concentrated solution in an aromatic petroleum solvent when necessary to facilitate mixing) to different portions of San Joaquin Valley (California) medium curing asphalt cutback and testing of the compositions thus obtained are shown in the table below.

| Example in Which Additive was Prepared | Percent of Coating Retained | |
|---|---|---|
| | Concentration of Additive in Asphalt, Percent by Weight | |
| | 0.5 | 1.0 |
| I | 100 | 100 |
| II | 95 | 95 |
| III | 90 | 100 |
| IV | 65 | 100 |
| V | 100 | 100 |
| VI | 95 | 100 |
| VII | 85 | 95 |
| VIII | 60 | 100 |
| IX | 90 | 100 |
| X | 100 | 100 |
| XI | 85 | 100 |
| XII | 85 | 100 |
| XIII | 95 | 100 |
| XIV | 90 | 100 |
| XV | 85 | 95 |
| XVI | 95 | 100 |
| No Additive | 10 | 10 |

From the results given in the table, it will be seen that in all cases a retention of 95% to 100% was obtained for the asphalt compositions containing 1% by weight of the products of the invention. For use in asphalt those products prepared from the haloepoxyalkane and ammonia in a 1 to 10 molar ratio and an initial reaction temperature of 40° C. are indicated to be superior to those prepared at a 1 to 5 molar ratio and a reaction temperature of 70° C.

EXAMPLE XVIII

A series of tests similar to those carried out in the preceding example was run employing a limestone aggregate instead of the rhyolite aggregate. The results shown in the table below were obtained.

| Example in Which Additive was Prepared | Percent of Coating Retained | |
|---|---|---|
| | Concentration of Additive in Asphalt, Percent by Weight | |
| | 0.5 | 1.0 |
| I | 40 | 90 |
| II | 80 | 95 |
| III | 85 | 100 |
| IV | 40 | 90 |
| V | 40 | 95 |
| VI | 40 | 95 |
| VII | 25 | 95 |
| VIII | 20 | 60 |
| IX | 40 | 70 |
| X | 50 | 100 |
| XI | 40 | 90 |
| XII | 60 | 75 |
| XIII | 30 | 80 |
| XIV | 30 | 95 |
| XV | 30 | 70 |
| XVI | 50 | 100 |

EXAMPLE XIX

To determine the thermal stability in asphalt of the product prepared in Example I, samples of a San Joaquin Valley (California) medium curing asphalt cutback containing the indicated amounts of the additive were heated for 7 days at 275° F. and then tested in the modified total water immersion test described in Example XVII. Further portions of the asphalt containing the additive were tested without heating as control experiments. The following results were obtained:

| Additive, Weight Percent | Percent Coating Retained | |
|---|---|---|
| | No Heating | After Heating Seven Days at 275° F. |
| 0.5 | 100 | 80 |
| 1.0 | 100 | 90 |
| none | 10 | 0 |

When the above test was repeated using crystalline limestone as the aggregate, the following results were obtained:

| Additive, Percent by Weight | Percent Coating Retained | |
|---|---|---|
| | No Heating | After Heating Seven Days at 275° F. |
| 1.0 | 90 | 80 |
| none | 10 | 10 |

The following example illustrates the effectiveness of the products of the invention as agents for protecting greases containing hydrophilic finely-divided solids against the action of water. For further and more detailed description of methods of compounding such greases reference is hereby made to the copending application of Walter H. Peterson, Serial No. 133,962, filed December 19, 1949, now Patent No. 2,623,852.

EXAMPLE XX

Five per cent by weight of silica, as an alcogel, was dispersed in a low viscosity petroleum lubricating oil. The tallow fatty acid-amide agents listed in the following tabulation were incorporated in the composition in amounts of 2.5% by weight of the composition (50% of the silica), and the composition treated by milling to form a homogeneous grease structure. The composition was milled by shearing until a grease of minimum obtainable penetration was produced. The grease compositions were subjected to a number of tests to determine their resistance to water. In the static hot water test a portion of the grease was smeared on the surface of a steel strip and the strip maintained immersed in water in an inclined position at about the boiling temperature of water for a period of 30 hours or any shorter period of time within which the oil separated from the grease and collected as a separate layer on top of the water. The water emulsion test was carried out similarly to the standard ANG-3A test used in the testing of grease compositions. In this test water is added in 2 cc. increments with intervening 2 minute stirring interval, until all of a 2 cc. increment of water is not absorbed by the grease in a following 2 minute stirring period, after which 4 cc. of water is added and the stirring continued for 4 minutes. The overall per cent of absorbed or emulsified water is taken as the numerical value of the test, together with the penetration of the resulting product. The oven-drying test comprises spreading out the resulting product from the water emulsion test, on the inside of a 250 cc. beaker and heating it at 100° C. in an oven for a period of time up to 24 hours, or any shorter period of time within which the grease appears to have deteriorated or bleeding of the oil from the grease has occurred. In the water roll test the grease was mixed with 20% by weight of water and the mixture rolled in a Shell roll test machine at about room temperature until the penetration of the grease had increased to a value of 230; the result is expressed as hours required for the specified increase in penetration; the longer the time required the better the grease.

The additive used in grease No. 1 was the product of Example I. The additive in grease No. 2 was prepared according to Example I except that the amount of tallow fat acids used was equal to one-half the equivalent of the polymeric oxygen-containing amine. The acetate of the additive used in grease No. 2 was used in grease No. 3.

Thus, in all cases the greases containing the improving agents of this invention were found to be stable in the presence of cold and hot water, while unmodified silica grease disintegrates even in cold water.

In addition to their illustrated utility as agents for improving the properties of asphalt and of greases containing hydrophilic finely-divided solids, the products of the invention have many other fields of utility. They can be employed as paper sizes, which can be precipitated upon the paper fibers in the beater or after the felting operation, alone or in conjunction with known sizing materials of the rosin soap variety. The products of the invention are useful for treating leather to improve the texture thereof. The products of the invention can be applied to woven fabrics, such as cotton, wool, silk, or synthetic-fiber textiles to render them water repellant, and as ingredients in paper-coating compositions. In each of the foregoing and in allied uses the substantial freedom from color in the products of the invention contributes significantly to the utility. The new products also are useful as lubricating oil additives, and they can be blended with natural as well as with synthetic waxes. The blends with waxes, as such or with added solvent, stain, etc., and/or emulsified in water, are useful as or in floor, furniture, automobile, and like polishes.

Asphalt compositions containing products of the present invention are described and claimed in the copending application, Serial No. 150,824, filed March 20, 1950 to which reference is hereby made.

The claimed invention is:

1. The amide of fatty acid and the polymeric condensation product of epichlorohydrin and ammonia, which polymeric condensation product contains a plurality of atoms of each of oxygen and nitrogen and is produced by heating epichlorohydrin with from about 5 to about 10 moles of ammonia per mole of epichlorohydrin in aqueous solution having a concentration of at least 15% $NH_3$, based upon the weight of the water, at a temperature of from about 20° C. to about 100° C., removing water and excess ammonia from the product thus formed, and heating said product thus formed in the presence of added fixed alkali, the acyl groups of said amide being acyl groups of at least one of the fatty acids having from 12 to 20 carbon atoms.

2. The amide defined by claim 1 in which from 20% to about 40% of the nitrogen atoms of said condensation product are combined in amido linkage.

3. An N-acyl substituted polymeric condensation product of haloepoxyalkane and ammonia, which polymeric condensation product contains a plurality of atoms of each of oxygen and nitro-

| Grease No. | Additive | Minimum micro-penetration | Static hot water test | Water emulsion, ANG-3A | | Oven drying of emulsion | Water roll test |
|---|---|---|---|---|---|---|---|
| | | | | $H_2O$ | pen. | | |
| 1 | ⅓ amide of 5:1 ammonia-epichlorohydrin product. | 115 | satisfactory to 30 hours. | 17 | 110 | satisfactory to 24 hours. | 6 |
| 2 | ½ amide of 10:1 ammonia-epichlorohydrin product. | 130 | do | 40 | 138 | do | 4 |
| 3 | acetate salt of ½ amide of 10:1 ammonia epichlorohydrin polymer product. | 91 | do | 38 | 100 | do | 7 | gen and is produced by condensing a haloepoxyalkane with ammonia in molar excess in solution in a polar solvent having a concentration of at least 15% NH₃ based upon the weight of the polar solvent, at a temperature of from about 20° C. to about 100° C. and removing the polar solvent and excess ammonia from the resulting product.

4. An N-acyl-substituted polymeric condensation product of haloepoxyalkane and ammonia, which polymeric condensation product contains a plurality of atoms of each of oxygen and nitrogen and is produced by condensing a haloepoxyalkane with ammonia present in amount corresponding to from about 4 to about 20 moles of ammonia per mole of haloepoxyalkane in solution in a polar solvent having a concentration of at least 15% NH₃ based upon the weight of the polar solvent, at a temperature of from about 20° C. to about 100° C. and heating the resulting product in the presence of added fixed alkali to a temperature above about 125° C.

5. The N-acyl-substituted polymeric condensation product of epichlorohydrin and ammonia defined by claim 4.

6. The N-acyl-substituted polymeric condensation product defined by claim 4 in which the N-acyl groups are acyl groups of long-chain alkane sulfonic acids.

7. The N-acyl-substituted polymeric condensation product defined by claim 4 in which the N-acyl groups are acyl groups of at least one carboxylic acid having a molecular weight within the range of from about 150 to about 500.

8. The N-acyl-substituted polymeric condensation product defined by claim 7 in which the N-acyl groups are acyl groups of tall oil acids.

9. The N-acyl-substituted polymeric condensation product defined by claim 7 in which the N-acyl groups are acyl groups of tallow fat acids.

10. The amide of oleic acid and the polymeric condensation product of epichlorohydrin and ammonia, which polymeric condensation product contains a plurality of atoms of each of oxygen and nitrogen and is produced by condensing epichlorohydrin with ammonia present in an amount corresponding to a molar excess of ammonia based on the epichlorohydrin in solution in water at a concentration of at least 15% NH₃, based on the weight of the water, and heating the resulting product with added fixed alkali at a temperature of from about 125° C. to about 170° C.

11. The amide of long-chain fatty acid with the polymeric condensation product of epichlorohydrin and ammonia, with polymeric condensation product contains a plurality of atoms of each of oxygen and nitrogen and is produced by condensing epichlorohydrin with ammonia present in solution in water at a concentration of about 28% NH₃, based on the weight of the water, and in an amount corresponding to from about 4 to about 20 moles of ammonia per mole of epichlorohydrin and heating the resulting product with added fixed alkali at a temperature of from about 125° C. to about 170° C., the amide being produced by heating from about 0.20 to about 0.80 equivalent of long-chain fatty acid with one equivalent of said polymeric condensation product.

12. The partial amide of a carboxylic acid and the polymeric condensation product of epichlorohydrin and ammonia, which polymeric condensation product contains a plurality of atoms of each of oxygen and nitrogen and is produced by condensing epichlorohydrin with from about 4 to about 20 moles of ammonia in aqueous solution having a concentration of at least 15% NH₃, based upon the weight of the water, at a temperature of from about 20° C. to about 100° C., removing water and excess ammonia from the resulting product, and heating said resulting product in the presence of added fixed alkali, in said partial amide from about 20% to about 40% of the nitrogen atoms of said polymeric condensation product being combined with said carboxylic acid in N-substituted amido groups and from about 40% to about 70% of the nitrogen atoms of said polymeric condensation product being combined with said carboxylic acid in N-acyloxy-ammonium groups but not over about 80% of the other nitrogen atoms than those that are combined in said N-substituted amido groups being combined in said N-acyloxy-ammonium groups.

13. The partial amide of oleic acid and the polymeric condensation product of epichlorohydrin and ammonia, which partial condensation product contains a plurality of atoms of each of oxygen and nitrogen and is produced by condensing epichlorohydrin with an approximately 28% by weight aqueous solution of ammonia present in an amount corresponding to from about 4 to about 20 moles of ammonia per mole of epichlorohydrin and heating the resulting product with added fixed alkali at a temperature of from about 125° C. to about 170° C., said partial amide being produced by heating said condensation product with from about 0.20 to about 0.80 equivalent of oleic acid per equivalent of the polymeric condensation product and then partially neutralizing the resulting product with an additional amount of oleic acid equivalent to not over 80% of the remaining neutralizable nitrogen atoms.

14. The partial amide of the polymeric condensation product of a haloepoxyalkane and ammonia, which polymeric condensation product contains a plurality of atoms of each of oxygen and nitrogen and is produced by condensing a haloepoxyalkane with a molar excess of ammonia in solution in a polar solvent having a concentration of at least 15% NH₃, based on the weight of the polar solvent, at a temperature of from about 20° C. to about 100° C. and heating the resulting product in the presence of added fixed alkali to a temperature above about 125° C., in said partial amide from about 20% to about 40% of the nitrogen atoms of said polymeric condensation product being combined in N-acyl amido groups and from about 40% to about 70% of the nitrogen atoms of said polymeric condensation product being combined in N-acyloxy-ammonium groups, but not over about 80% of the other nitrogen atoms than those that are combined in N-substituted amido groups being combined in N-acyloxy-ammonium groups, the salt-forming acyloxy radicals and the amide-forming acyl radicals being acyloxy radicals and acyl radicals, respectively, of organic acid having a molecular weight of at least 130.

15. The partial amide of an organic acid having a molecular weight of at least about 130 and the polymeric condensation product of haloepoxyalkane and ammonia, which polymeric condensation product contains a plurality of atoms of each of oxygen and nitrogen and is produced by condensing a haloepoxyalkane with a molar excess of ammonia in aqueous solution having a concentration of at least 15% NH₃, based upon the weight of the water, at a temperature between about 20° C. and about 100° C.

and heating the resulting product in the presence of added fixed alkali to a temperature in excess of 125° C.

16. An N-acyl-N-acyloxy-substituted polymeric condensation product of epichlorohydrin and ammonia, which polymeric condensation product contains a plurality of atoms of each of oxygen and nitrogen and is produced by condensing epichlorohydrin with ammonia present in amount corresponding to from about 4 to about 20 moles of ammonia per mole of epichlorhydrin in solution in a polar solvent having a concentration of at least 15% $NH_3$, based upon the weight of the polar solvents, at a temperature of from about 20° C. to about 100° C. and heating the resulting product in the presence of added fixed alkali to a temperature above about 125° C.

17. The N-acyl- N-acyloxy-substituted polymeric condensation product defined by claim 16 in which the N-acyl groups and the N-acyloxy groups are acyl groups and acyloxy groups, respectively, of long-chain alkane sufonic acids.

18. The N-acyl- N-acyloxy-substituted polymeric condensation product defined by claim 16 in which the N-acyl groups and the N-acyloxy groups are acyl groups and acyloxy groups, respectively, of at least one of the carboxylic acids having a molecular weight within the range of from about 150 to about 500.

19. The N-acyl- N-acyloxy-substituted polymeric condensation product defined by claim 16 in which the N-acyl groups and the N-acyloxy groups are acyl groups and acyloxy groups, respectively, of tall oil acids.

20. The N-acyl- N-acyloxy-substituted polymeric condensation product defined by claim 16 in which the N-acyl groups and the N-acyloxy groups are acyl groups and acyloxy groups, respectively, of tallow fat acids.

HARRY J. SOMMER.
TOM B. ALBIN.
PAUL H. WILLIAMS.

References Cited in the file of this patent

UNITED STATES PATENTS

| Number | Name | Date |
|---|---|---|
| 1,977,251 | Stallmann | Oct. 16, 1934 |
| 2,306,329 | De Groote et al. | Dec. 22, 1942 |

FOREIGN PATENTS

| Number | Country | Date |
|---|---|---|
| 884,271 | France | Aug. 9, 1943 |